United States Patent
Bennett

(10) Patent No.: US 7,464,971 B2
(45) Date of Patent: Dec. 16, 2008

(54) PIPE FITTINGS

(76) Inventor: Lavon Bennett, 3231 E. Ellis St., Mesa, AZ (US) 85213

( * ) Notice: Subject to any disclaimer, the term of this patent is extended or adjusted under 35 U.S.C. 154(b) by 0 days.

(21) Appl. No.: 11/725,850

(22) Filed: Mar. 19, 2007

(65) Prior Publication Data
US 2007/0222217 A1 Sep. 27, 2007

Related U.S. Application Data

(60) Provisional application No. 60/785,199, filed on Mar. 21, 2006.

(51) Int. Cl.
*F16L 17/00* (2006.01)
(52) U.S. Cl. .................... 285/373; 285/15; 285/67; 285/197; 285/325; 285/921
(58) Field of Classification Search ............ 285/15–17, 285/373, 419, 921, 197; 138/99
See application file for complete search history.

(56) References Cited

U.S. PATENT DOCUMENTS

| | | | | |
|---|---|---|---|---|
| 518,805 | A * | 4/1894 | Cooper | 138/99 |
| 3,151,631 | A * | 10/1964 | Yano | 138/97 |
| 3,423,111 | A * | 1/1969 | Elsner | 285/340 |
| 3,771,820 | A * | 11/1973 | Hoss et al. | 285/373 |
| 3,857,588 | A | 12/1974 | Curtin | |
| 3,971,574 | A | 7/1976 | Curtin | |
| 4,103,943 | A | 8/1978 | Curtin | |
| 4,109,944 | A | 8/1978 | Curtin | |
| 4,111,234 | A * | 9/1978 | Wells et al. | 138/99 |
| 4,429,907 | A | 2/1984 | Timmons | |
| 5,480,193 | A * | 1/1996 | Echols et al. | 285/45 |
| 5,853,030 | A * | 12/1998 | Walding | 138/99 |

* cited by examiner

*Primary Examiner*—Aaron M Dunwoody
*Assistant Examiner*—Fannie Kee
(74) *Attorney, Agent, or Firm*—Terry M. Crellin

(57) ABSTRACT

Pipe fittings, used in joining abutting ends of two pipe sections, comprise a pair of semi-cylindrical members that are adapted to fit around and engage the periphery of opposed ends of the two abutting ends of the pipe sections. Longitudinal edges of the two semi-cylindrical members are formed so as to mate with one another to form a mechanical means of locking the semi-cylindrical members together in tight engagement with the ends of the pipes. Each of the semicylindrical members has a seal mechanism formed of a resilient, elastomeric material which forms a mechanical, water-tight seal between the mutually respective pair of semi-cylindrical members as well as the opposite ends of the pipes to which the pair of semi-cylindrical members have been attached.

2 Claims, 3 Drawing Sheets

PIPE FITTINGS

CROSS REFERENCE TO RELATED APPLICATION

This application claims the priority from U.S. Provisional Patent Application No. 60/785,199 filed on Mar. 21, 2006.

BACKGROUND OF THE INVENTION

1. Field of the Invention

The invention relates to fittings for joining sections of pipe, and more particularly to such fittings for repairing leaks in existing piping or joining an additional pipe line to existing pipe where the existing pipe is relatively inaccessible and cannot be removed and replaced without substantial difficulty.

2. State of the Art Prior to the Invention

Plastic pipes have become widely used in sprinkler systems because of their low cost and ease of installation and repair. Such pipes, commonly referred to as PVC pipes because of their typical polyvinyl chloride composition, may be joined without threading by applying an adhesive such as a solvent cement type to the ends of the pipes and slipping a smooth-bored fitting over the ends of the pipes.

When a break occurs in an underground piping system made from PVC piping, it can be repaired by digging away the dirt over the break and then cutting out a small section of pipe that contains the break. A coupling is then placed on the two opposed ends of the cut pipe. A conventional coupling is a simply rigid, hollow, cylindrical section that has an internal diameter that fits snugly over the external diameter of the pipe. Adhesive is applied to the inside surface of one end of the coupling and around the external surface of one end of the pipe. Sliding the coupling over the end of the pipe is done rapidly and effortlessly. Adhesive is now applied to the internal surface of the second end of the coupling and the end of the second pipe. The end of the second pipe must now be slid into the second end of the coupling and great difficulty is encountered in accomplishing this step. The two ends of the pipe are bent as far as possible away from their center lines so that the gap between the second end of the coupling and the end of the second pipe is increased sufficiently to allow insertion of the end of the second pipe into the second end of the coupling and forcing the pipes back into axial alignment which also forces the end of the second pipe into the second end of the coupling. The dirt along a relatively long section on each side of the pipe where the coupling is being installed must be removed to permit sufficient bending of the pipe in existing underground piping systems. This requires considerable labor in both digging away of the dirt as well as replacement of the dirt once the repair is made.

In those situations where a new pipe line is desired to be added to an existing pipe line, dirt must be removed to expose the area of the existing piping to which the second pipe line is to be connected. The existing pipe is cut and a small section removed so that a fitting in the form of a tee or a wye can be connected in line in the existing pipe. These fittings, the tee and the wye, have two ends very similar to the ends of the coupling which was described above, and the two ends of the fittings must be installed in the existing pipe line in the same manner as described above for installing a coupling in the existing pipe line.

It has been acknowledged in the prior art that it would be desirable to provide a fitting that could be installed in an existing piping system without requiring bending of the two pipes to which the fitting is to be connected. The disclosure of a series of inventions is shown in U.S. Pat. Nos. 3,971,574; 4,103,943; 4,109,944; and 4,429,907 wherein a coupling is formed of two semi-cylindrical members which are arranged to enclose and encapsulate the opposite ends of two pipes that are to be connected for fluid flow through the connected pipes. The two semi-cylindrical members are made of plastic and designed to be adhesively bonded to each other and to the two ends of the pipes by a suitable cement so as to provide a water-tight seal. The use of cement to bond the semi-cylindrical members is a very messy procedure, and becomes even more complicated by the required effort of maintaining the semi-cylindrical members in constant, firm contact with the two ends of the pipe until the cement has set sufficiently to hold the assembly in its proper place. The series of developments disclosed in the above-mentioned U.S. Patents are directed to various means of holding the semi-cylindrical members in their proper positions as the cement sets. The use of a liquid cement is still messy, and it would clearly be desirable to have a system in which a liquid cement is not necessary in forming a liquid-tight seal between the two semi-cylindrical members and the two ends of the pipes.

OBJECTIVE OF THE PRESENT INVENTION

The principal object of the present invention is to develop a system for connecting the opposed ends of two pipes that are aligned with each other using two semi-cylindrical members that fit snugly around the opposed ends of the two pipes and span between the opposed ends of the two pipes, with the semi-cylindrical members being provided with a mechanical means of making a fluid tight seal between themselves and the opposed ends of the two pipes without using any cement of any kind.

SUMMARY OF THE INVENTION

The objective of the present invention is accomplished by providing a system for connecting the opposed ends of two pipes that are aligned with an improved fitting comprising two complimentary, semi-cylindrical members that are adapted to be brought together and mechanically joined to each other to form a resulting cylindrical fitting. The cylindrical fitting has opposite, otherwise open ends that envelope the respective opposite ends of two pipes that are to be connected together using the fitting. Each semi-cylindrical member has a resilient gasket member associated therewith. Each gasket member has two arcuate elements in which the arcuate elements have the shape of a half circle. The two arcuate elements are received into mutually respective arcuate grooves formed in the internal surface of the respective semi-cylindrical member, with the arcuate grooves forming substantially a half circle that extends from one longitudinal side to the other longitudinal side of the semi-cylindrical member. The annular grooves are spaced apart from each other along the longitudinal length of the semi-cylindrical members. Each resilient gasket member has two opposite, longitudinal sides that span between respective distal ends of the two arcuate elements of the gasket member. The opposite ends of the longitudinal sides of the gasket member are molded integrally with their respective distal ends of the pair of arcuate elements so that the resilient gasket member is a continuous, unitary member. The resilient gasket member is molded from a resilient elasomeric material.

The arcuate elements of each of the gasket members are received in the arcuate grooves of their respective semi-cylindrical member, and the connecting longitudinal sides of each of the gasket members lie along respective longitudinal sides of the respective semi-cylindrical member. When the two semi-cylindrical members are joined together around the ends of two pipes that are to be joined, the arcuate elements of the associated gasket members make a mechanical, fluid-tight seal between the respective ends of the pipes and the semi-cylindrical members, and the engagement between the longitudinal sides of the two associated gasket members with each other make a mechanical fluid-tight seal along the longitudinal sides of the two semi-cylindrical members of the resulting fitting. Accordingly, the fitting, including the two gasket members thereof, achieves a mechanical, fluid-tight seal without use of an adhesive or cement.

The invention will be described in more particularity with reference to the accompanying drawings.

DESCRIPTION OF THE PREFERRED EMBODIMENTS

In accordance with the present invention, there is provided an improved fitting for connecting the opposed ends of two pipes that are axially aligned and in close proximity to each other. The improved fitting comprises two complimentary, semi-cylindrical members that are adapted to be brought together and mechanically joined to each other to form a resulting cylindrical fitting that envelopes the ends of the two aligned pipes. Each of the semi-cylindrical members is provided with a novel gasket member, and the gasket members of the two mechanically joined semi-cylindrical members interacts with the joined semi-cylindrical members, the two ends of the pipe that are being connected and themselves to form a fluid-tight seal between the resulting cylindrical fitting and the ends of the two pipes so that there is no need to employ adhesives or cements in accomplishing the fluid-tight seal between the fitting and the pipes.

Figure 1:
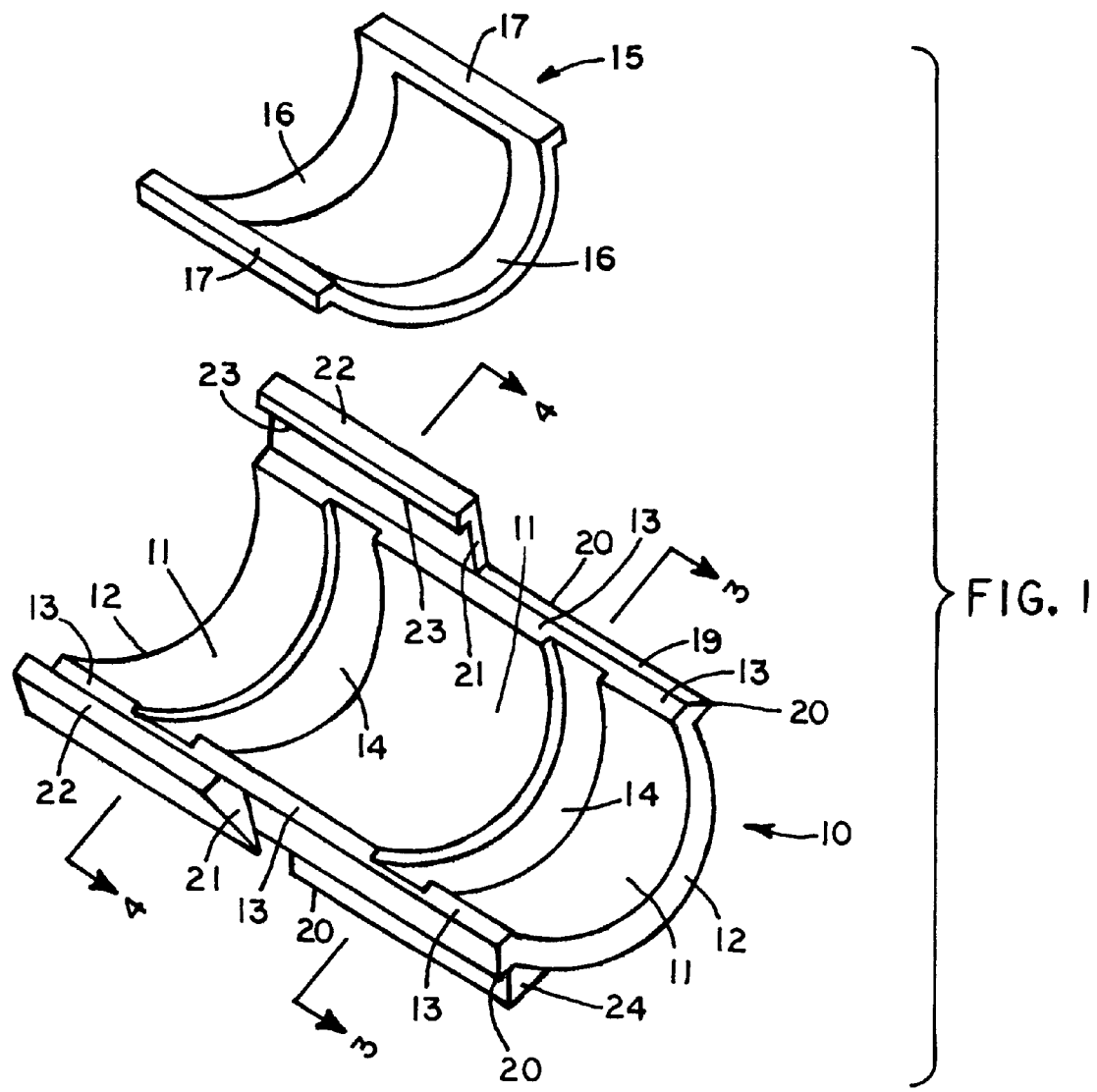
FIG. 1 is a pictorial view of one of the semi-circular members of the present invention which can be used with a second identical member to make a fitting for connecting abutting ends of two pipes, with the gasket member which is associated with the semi-circular member shown in exploded view.

One of the semi-cylindrical members 10 is shown in FIG. 1. The cylindrical member 10 has a semi-cylindrical sidewall 11 that has two ends 12 and two longitudinally extending side edges 13. The cylindrical member 10 is formed of any applicable thermoplastic material, preferably polyvinylchloride. The thickness of the sidewall 11 is generally between about 2.5 and about 3.5 millimeters. The two longitudinally extending side edges 13 will of course have a thickness that is substantially the same as the thickness of the sidewall 11.

Figure 5:
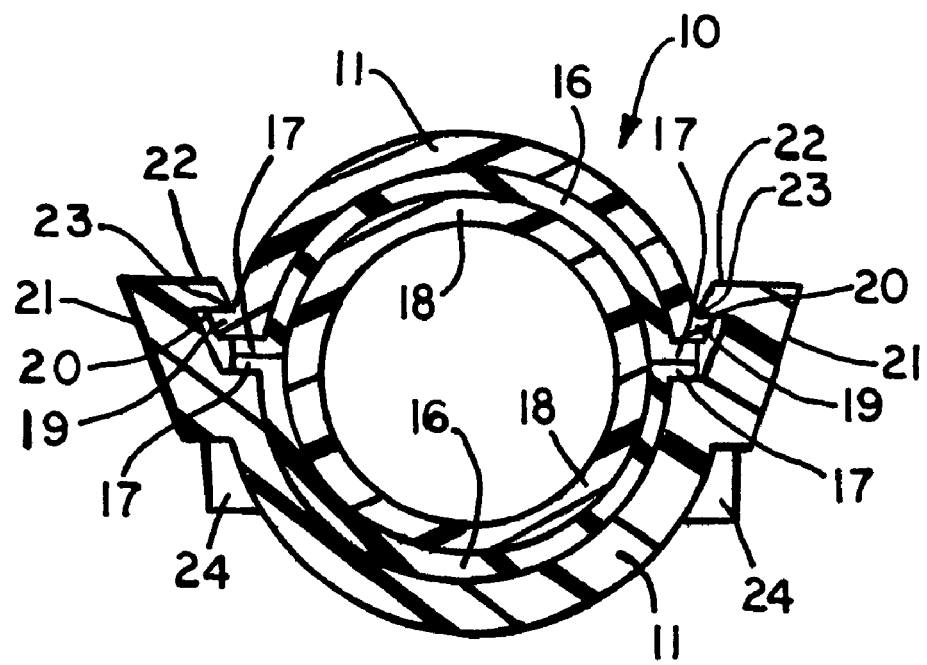
FIG. 5 is a cross section of the two semi-circular members and their associated gasket members of FIG. 2 taken along line 5-5 of FIG. 2, with semi-circular members and the gasket members shown in their proper operational position.
Figure 6:
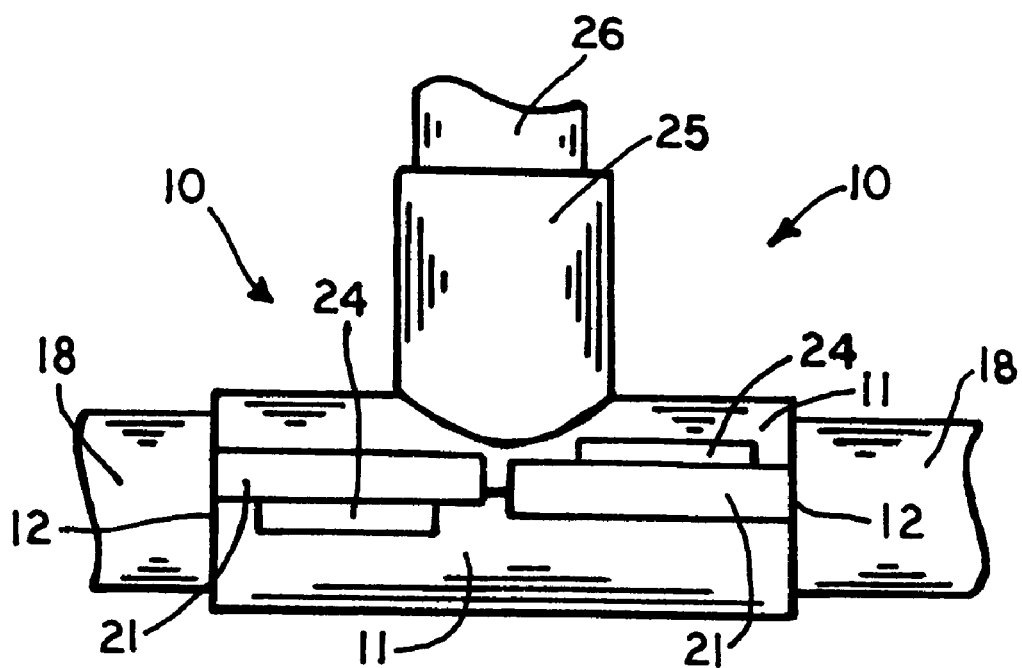
FIG. 6 is a side elevation view of a fitting in accordance with the invention showing a tee fitting that is joining the end of an additional pipe to an established pipe that has been breached to allow insertion of the fitting between two opposed ends of the breached pipe.

A pair of arcuate, semi-circular grooves 14 are formed on the inside surface of the sidewall 11. The arcuate grooves 14 form a substantially half circle that extends from one longitudinal side edge 13 to the other longitudinal side edge 13 of the sidewall 11. The arcuate grooves 14 are spaced apart from each other along the longitudinal length 15 of the inside surface of the sidewall 11. The arcuate grooves 14 (FIG. 1) have a width of at least about 2 to 3 millimeters, and preferably the width of the arcuate grooves 14 is between about 3 and about 10 millimeters. The longitudinal length of the sidewall 11 will be at least 20 about 35 millimeters, and preferably between about 40 and 50 millimeters, at least for the two-way coupling fitting as shown in FIGS. 1-5. The longitudinal length of the sidewall 11 will be longer for a tee fitting as shown in FIG. 6 and explained in more detail hereinafter.

As mentioned, the arcuate grooves 14 are spaced apart from each other. Preferably, the arcuate grooves 14 will be spaced apart sufficiently such that there will be a continuous segment of the sidewall 11 between the arcuate grooves that has a length of from about 8 to about 20 millimeters for the two-way coupling fitting as shown in FIGS. 1-5. The longitudinal length of continuous sidewall 11 between the arcuate grooves 14 for a tee fitting as shown in FIG. 6 will be longer than for the two-way coupling fitting as will be explained in more detail hereinafter. The arcuate grooves 14 further preferably have a depth of between about 1 and 2 millimeters.

A gasket member 15 is provided for each semi-circular member 10, with the gasket member 15 being adapted to fit in the grooves 14 and along the portion of the longitudinal side edges 13 of the semi-circular member 10 extending between the grooves 14. The gasket member 15 comprises a pair of arcuate sections 16 that are adapted to fit snugly within the grooves 14 in the sidewall 11 of the semi-cylindrical member 10. Thus, the arcuate sections 16 have substantially the shape of a ribbon curved in a half circle. Each resilient gasket member 15 has two opposite, longitudinal sides 17 that span between respective distal ends of the two arcuate sections 16 of the gasket member 15. As illustrated, the longitudinal sides 17 have the shape of a relatively narrow, flat ribbon whose width is no greater than about the thickness of the sidewall 11 of the semi-circular member 10. The longitudinal sides 17 are molded integrally with the arcuate sections 16, with the upper surface of the flat ribbon of the longitudinal sides 17 coincide with and in effect form the distal ends of the arcuate sections 16. The resilient gasket member 15 is thus a continuous, unitary member. The resilient gasket member is molded from a resilient elastomeric material.

The dimensions of the gasket member 15 are such that the arcuate sections 16 thereof will fit snugly in the grooves 14, with the sides 17 of the gasket member lying along the longitudinal side edges 13 between the grooves 14. Thus the dimensions of the gasket member 15 depend upon the dimensions of the grooves 14 and the length of the longitudinal side edges 13 between the grooves 14. The two independent measurements for the gasket member 14 is that the thickness of the ribbon forming the arcuate section 16 will be such that it is at least between about 0.3 and 1 millimeter larger than the depth of the grooves 14 in the sidewall 11 of the semi-circular member 10, and the thickness of the longitudinal side edges 13 will be between about 0.75 and 2 millimeters.

Figure 2:
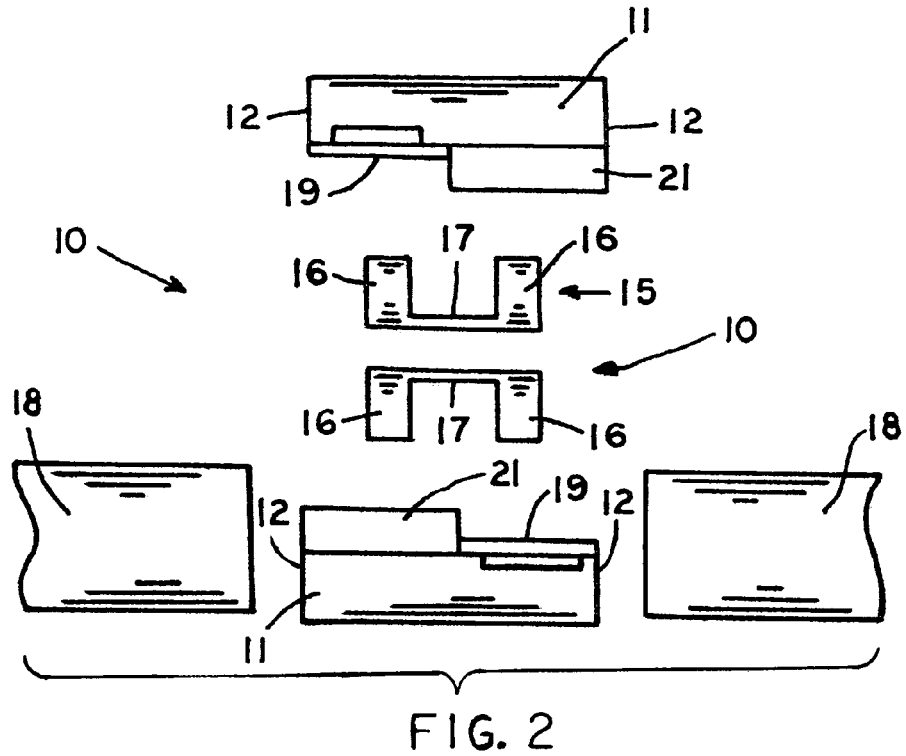
FIG. 2 is an exploded side elevation view showing two of the semi-circular members and their associated gasket members ready to be mechanically connected to each other over the abutting ends of two pipes.
Figure 3:
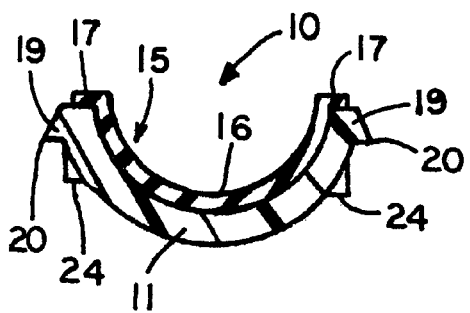
FIG. 3 is a cross section of the semi-circular member of FIG. 1 taken along line 3-3 of FIG. 1 with the gasket member in its proper operational position.
Figure 4:
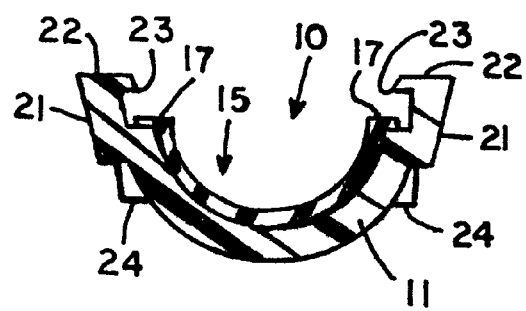
FIG. 4 is a cross section of the semi-circular member of FIG. 1 taken along line 4-4 of FIG. 1 with the gasket member in its proper operational position.

A pair of complimentary, semi-cylindrical members 10 are adapted to be superimposed one over the other with their broad, open sides facing each other so that their respective longitudinal edges 13 abut one another so as to form a resulting cylindrical fitting having two open ends. In use, as best shown in FIGS. 2 and 5, the opposite, otherwise open ends of the resulting cylindrical fitting envelope the opposite ends 18 of two pipes that are to being connected together. Means are provided to mechanically join or lock the mutually respective, abutting longitudinal edges 13 of the semi-cylindrical members 10 together so that the internal cylindrical surfaces of the semi-cylindrical members 10 are held firmly in snug engagement with the outer surfaces of the ends 18 of the two pipes that are located within the resulting fitting.

In a preferred embodiment as illustrated in the drawings, the mechanical means of joining and locking the abutting longitudinal edges 13 of the semi-cylindrical members 10 together comprises a ledge 19 projecting outwardly adjacent to the longitudinal edges 13 on each of the semi-cylindrical members 10. The ledge 19 extends essentially along the entire length of each of the longitudinal edges 13 of the semi-cylindrical member 10 from one end to the other end thereof. A sharp outer edge 20 extends along the length of the ledge 19. An upstanding sidewall 21 projects upwardly from the ledge 19, with the upstanding sidewall 21 being positioned so as to extend from one end of the semi-cylindrical member 10 inwardly to a position that is no more than one-half the distance between the opposite ends of the semi-cylindrical member 10. The upper side of the sidewall 21 has a sidewall ledge 22 integrally formed therewith that extends inwardly from the sidewall 21 and ends in a sharp inner edge 23. When two complimentary semi-cylindrical members 10 are brought into their working, abutting positions about the opposite ends 18 of two pipes, as shown in FIG. 5, the sidewalls 21 of each of the semi-cylindrical members extend over the mutually respective ledges 19, and the sidewalls 21 can be forced over the ledges 19 until the sharp inner edge 23 of the sidewall ledge 22 snaps over and locks with the sharp outer edge 20.

To facilitate the forcing of the sharp outer and inner edges 20 and 23 over each other and into locking engagement, two things can be done. First the ledges 19 and 22 which form the sharp edges 20 and 23 can be tapered so that the taper of ledges 19 are complimentary with the taper of ledges 22 to facilitate the edges sliding over each other. Second, lugs 24 can be positioned so as to extend outwardly from the outer surface of the semi-cylindrical members 10 immediately below the portion of the side ledges 19 which do not have a sidewall ledge 22 extending therefrom. When the two complimentary semi-cylindrical members 10 are brought into working, abutting arrangement, the lugs 24 will be positioned directly opposite mutually respective sidewall ledges 22, and a gripping tool such as a pair of players can be used to grip the mutually respective lugs 24 and sidewall ledges 22 to force them toward each other so as to force the sharp outer and inner edges 20 and 23 over each other and into locking engagement to thereby lock the complimentary semi-cylindrical members 10 together.

When the complimentary semi-cylindrical members 10 are snapped and locked together around the opposite ends 18 of two pipes, the arcuate sections 16 of the gasket members 15 are forced into fluid-tight engagement with the surface of the respective ends 18 of the pipes, and the mutually respective sides 17 of the gasket members 15 are forced into fluid-tight engagement with each other along the side edges of the fitting between the arcuate sections 16. Thus, a complete, fluid-tight seal is formed between the resulting fitting, i.e., the complimentary, interlocked semi-cylindrical members 10 and the ends 18 of the two pipes.

The semi-cylindrical members 10 can be modified slightly from those of the above description so that the resulting fitting is a tee which allows an additional pipe line to be added when desired to the two ends of the existing pipe that are joined by the tee fitting. As shown in FIG. 6, the semi-cylindrical members 10 are essentially the same as previously described herein with two modifications. First, one of the semi-cylindrical sections 10 has an opening in it and a hollow cylinder 25 extends from that opening. The cylinder 25 opens at one end into the opening in the semi-cylindrical section 10, and the other end of the cylinder 25 is open and adapted to have the end of another pipe 26 telescopically received therein. The end of the other pipe 26 can be sealed to the cylinder 25 by use of a solvent cement as is conventional in the art.

The second modification to the semi-cylindrical members 10 of FIG. 6 is that the members 10 are somewhat longer in length than the coupling members described above with respect to FIGS. 1-5. The additional length is provided to allow the addition of the cylinder 25 to the fitting as shown in FIG. 6. The cylinder 25 is located, of course, in the length of the semi-cylindrical member 10 which is between the grooves 14 which are identical to those described previously with respect to FIGS 1-5. Because of the increased distance between the grooves 14 in the fitting forming the tee of FIG. 6, the length of the sides 17 of the gasket member 15 will also be increased as compared to the gasket members 15 of the coupling fitting shown in FIGS. 1-5 and described hereinbefore.

It should be recognized that the modification shown in FIG. 6 could also be arranged so as to have the fitting being made of two half pieces in which the division between the half pieces falls on a central plane that passes through the center axes of all three of the openings for the pipes. In such a case, the section of the fitting which will receive the third pipe has a semicircular groove similar to the grooves 14 shown in the embodiments illustrated in the drawings. The gasket is also modified so that it includes a third semi-circular ribbon section similar to the sections 16 shown in the embodiments illustrated in the drawings. One of the sides of the gasket will join the semi-circular ribbon sections in an ell-shape so as to join the left hand ribbon section on the first pipe to the center ribbon section on the third pipe and then join the right hand ribbon section on the second pipe to the center ribbon section on the third pipe. The section of the fitting which will receive the third pipe will have longitudinal edges, ledges with sharp edges, upstanding sidewalls, sidewall edges, sharp inner edges and lugs similar to the longitudinal edges 13, ledges 19 with sharp edges 20, upstanding sidewalls 21, sharp inner edges 23 and lugs 24 shown in the embodiments illustrated in the drawings.

The invention claimed is:

1. A fitting for connecting the opposed ends of two pipes that are axially aligned and in close proximity to each other, said fitting comprising two complimentary, semi-cylindrical fitting members that are adapted to be brought together and joined to each other to form a resulting cylindrical fitting that envelopes said opposed ends of said two pipes;

semi-cylindrical gasket members positioned adjacent to inside surfaces of said respective semi-cylindrical fitting members;

means for mechanically joining and locking said semi-cylindrical fitting members together about said ends of said pipes so that said semi-cylindrical fitting members force said semi-cylindrical gasket members associated with said semi-cylindrical fitting members into a fluid tight seal with themselves and with said ends of said pipes to produce a fluid-tight seal between said fitting and said ends of said pipes without the need to employ adhesives or cements in accomplishing the fluid-tight seal between said fitting and said ends of said pipes;

wherein said means for mechanically joining and locking said semi-cylindrical fitting members together comprises ledges projecting outwardly from respective longitudinal side edges of each of said semi-cylindrical fitting members, said ledges extending essentially along the entire length of each of the respective longitudinal side edges of said semi-cylindrical fitting members, each of said ledges further having a sharp outer edge that extends along the length of each of said ledges;

upstanding sidewalls projecting upwardly from each of said ledges, with said upstanding sidewalls positioned so that they extend inwardly from an end of said semi-cylindrical fitting members to a point that is no more than one-half the distance between opposite ends of said semi-cylindrical fitting members;

sidewall ledges formed integrally with an upper side of each of said upstanding sidewalls, said sidewall ledges extending inwardly from said upper side of said upstanding sidewalls, with said sidewall ledges ending in a sharp inner edge, whereby, when said semi-cylindrical fitting members are brought into positions to be joined and locked together, said upstanding sidewalls of each of said semi-cylindrical fitting members extend over mutually respective ledges that project from said longitudinal side edges of said semi-cylindrical fitting members, with said upstanding sidewalls being forced over said ledges until said sharp inner edge of said sidewall ledge snaps over and locks with said sharp outer edge of said ledges.

2. A fitting for connecting the opposed ends of two pipes that are axially aligned and in close proximity to each other, said fitting comprising two complimentary, semi-cylindrical fitting members that are adapted to be brought together and joined to each other to form a resulting cylindrical fitting that envelopes said opposed ends of said two pipes;

semi-cylindrical gasket members positioned adjacent to inside surfaces of said respective semi-cylindrical fitting members;

means for mechanically joining and locking said semi-cylindrical fitting members together about said ends of said pipes so that said semi-cylindrical fitting members force said semi-cylindrical gasket members associated with said semi-cylindrical fitting members into a fluid tight seal with themselves and with said ends of said pipes to produce a fluid-tight seal between said fitting and said ends of said pipes without the need to employ adhesives or cements in accomplishing the fluid-tight seal between said fitting and said ends of said pipes;

each of said semi-cylindrical fitting members has opposed, longitudinal side edges that face each other when said fitting member envelopes said ends of said aligned pipes;

each of said semi-cylindrical gasket members has an arcuate portion that lies adjacent to said inside surface of a respective semi-cylindrical fitting member; and side edges of each of said semi-cylindrical gasket members have the shape of relatively narrow, flat ribbons that lie along respective longitudinal side edges of said mutually respective semi-cylindrical fitting members, whereby said arcuate portions of said semi-cylindrical gasket members are forced into fluid-tight engagement with the surfaces of said ends of said aligned pipes, and said longitudinal sides of said semi-cylindrical gasket members are forced into fluid-tight engagement with each other to create a complete, fluid-tight seal between the resulting fitting and said ends of said aligned pipes; and wherein said means for mechanically joining and locking said semi-cylindrical fitting members together comprises ledges projecting outwardly from respective longitudinal side edges of each of said semi-cylindrical fitting members, said ledges extending essentially along the entire length of each of the respective longitudinal side edges of said semi-cylindrical fitting members, each of said ledges further having a sharp outer edge that extends along the length of each of said ledges;

upstanding sidewalls projecting upwardly from each of said ledges, with said upstanding sidewalls positioned so that they extend inwardly from an end of said semi-cylindrical fitting members to a point that is no more than one-half the distance between opposite ends of said semi-cylindrical fitting members;

sidewall ledges formed integrally with an upper side of each of said upstanding sidewalls, said sidewall ledges extending inwardly from said upper side of said upstanding sidewalls, with said sidewall ledges ending in a sharp inner edge, whereby, when said semi-cylindrical fitting members are brought into positions to be joined and locked together, said upstanding sidewalls of each of said semi-cylindrical fitting members extend over mutually respective ledges that project from said longitudinal side edges of said semi-cylindrical fitting members, with said upstanding sidewalls being forced over said ledges until said sharp inner edge of said sidewall ledge snaps over and locks with said sharp outer edge of said ledges.

* * * * *